(12) United States Patent
Stoner

(10) Patent No.: US 8,056,754 B2
(45) Date of Patent: Nov. 15, 2011

(54) MOVABLE CUP HOLDER DIVIDER

(75) Inventor: Kenneth A. Stoner, Northville, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 308 days.

(21) Appl. No.: 12/472,487

(22) Filed: May 27, 2009

(65) Prior Publication Data

US 2010/0301051 A1    Dec. 2, 2010

(51) Int. Cl.
*B65D 25/06*    (2006.01)
(52) U.S. Cl. .................. 220/533; 220/532; 220/529
(58) Field of Classification Search .................. 220/533, 220/529, 532; 248/311.2
See application file for complete search history.

(56) References Cited

U.S. PATENT DOCUMENTS

| | | | |
|---|---|---|---|
| 3,581,906 A * | 6/1971 | Joyce .................. | 211/126.5 |
| 4,346,813 A * | 8/1982 | Cho et al. .................. | 220/532 |
| 5,381,940 A * | 1/1995 | Wright .................. | 224/542 |
| 6,039,296 A | 3/2000 | Nishina et al. | |
| 6,206,260 B1 | 3/2001 | Covell et al. | |
| 6,279,744 B1 * | 8/2001 | Yu .................. | 206/372 |
| 6,361,008 B1 | 3/2002 | Gravenstreter | |
| 6,942,267 B1 | 9/2005 | Sturt | |
| 7,168,669 B2 | 1/2007 | Park | |
| 7,237,688 B2 * | 7/2007 | Pangerc et al. .................. | 220/532 |
| 7,341,297 B2 | 3/2008 | Nakamura et al. | |
| 7,487,946 B2 | 2/2009 | Thomas | |
| 7,510,158 B1 | 3/2009 | Terry et al. | |
| 2003/0160052 A1 * | 8/2003 | Mulaw .................. | 220/532 |
| 2007/0119855 A1 * | 5/2007 | Ishida et al. .................. | 220/737 |

* cited by examiner

*Primary Examiner* — Stephen Castellano

(57) ABSTRACT

The disclosed embodiment provides a beverage container holder for a vehicle that utilizes a bin-like member having a floor and generally vertical walls defining a compartment with an opening at its top. A partition member extends across the opening of the bin-like member to divide the compartment into two parts, wherein the partition member is manually adjustable to a plurality of locations within the bin-like member to provide for the retention of beverage containers of various sizes.

1 Claim, 4 Drawing Sheets

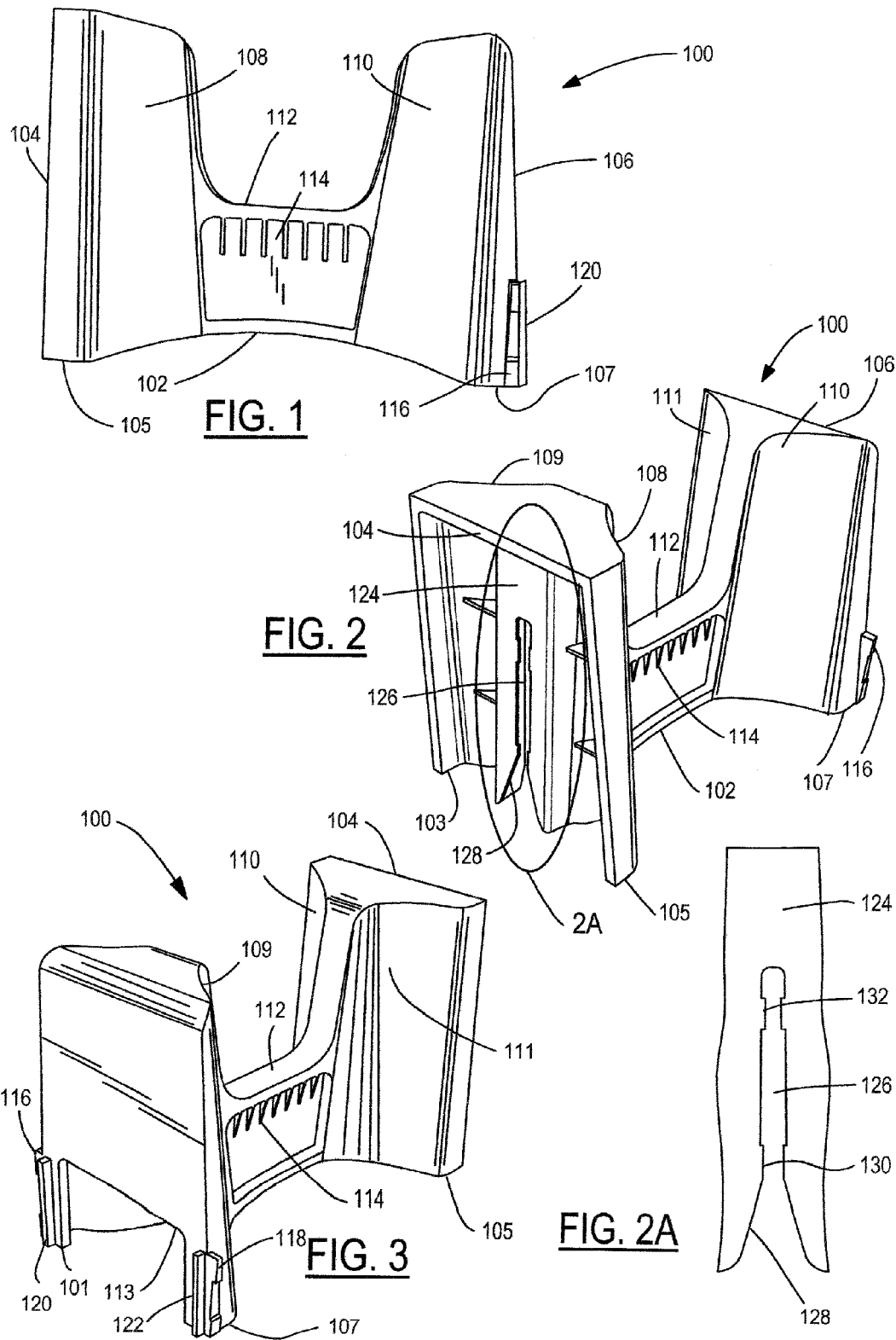

MOVABLE CUP HOLDER DIVIDER

BACKGROUND OF THE INVENTION

1. Field of the Invention

This invention relates to the field of beverage container holders for vehicles, and in particular to beverage container holders which are manually adjustable to hold beverage containers of different sizes.

2. Description of the Related Art

It is well known that beverage containers such as cans, bottles, foam cups and juice boxes come in various sizes, and that they may vary substantially in diameter and area. Therefore, it is desirable that beverage container holders for vehicles have means to make them easily adjustable so as to suitably receive and support such beverage containers of various sizes.

In this technology field, there have been several variations in adjustable beverage container holders, popularly known as "cup holders". Many involve a slidable or ratcheting device that is spring loaded to be moved to various positions within the bin. In other configurations, spring loaded arms are used to grip the container and accommodate various sizes. However, there is a need for simpler and lower cost devices that can accomplish the traditional purpose of adjusting a beverage container size to accommodate a wide range of container sizes.

SUMMARY OF THE INVENTION

A primary object of the present invention is to provide a beverage container holder for a vehicle which can receive and support beverage containers of different sizes with an easy to use adjustment device.

Another object of the present invention is to provide an adjustable cup holder in which the adjustment device is a unitary element without moving parts.

A further object of the present invention is to provide such a unitary adjustment device for a beverage container holder as a molded element at a reasonable cost.

A further object of the present invention is to provide an adjustable cup holder with vertical guides that locate the adjustment device in a plurality of positions within the cup holder.

A further object of the present invention is to provide a beverage container holder for a vehicle which can receive and support beverage containers of different sizes with a low cost and unitary adjustment device without additional moving components.

To achieve the above objects, the present invention provides a beverage container holder for a vehicle that comprises a bin-like member having a floor and generally vertical walls defining a compartment with an opening at its top; a divider or partition member which extends across the opening of the bin-like member to divide the compartment into two parts; wherein the partition member is manually adjustable to a plurality of locations within the bin-like member.

A more complete description of an embodiment of the inventive concept is presented below.

BRIEF DESCRIPTION OF THE SEVERAL VIEWS OF THE DRAWINGS

FIG. 1 is a plan view of the unitary partition member embodiment of the present invention.

FIG. 2 is a perspective view of the same unitary partition member embodiment shown in FIG. 1, rotated to reveal the detail of a first side with a locating channel.

FIG. 2A is a close-up view of the locating channel shown in FIG. 2.

FIG. 3 is a perspective view of the same unitary partition member embodiment shown in FIG. 1, rotated to reveal the detail of a second side with sets of locating tabs.

DETAILED DESCRIPTION OF THE INVENTION

Figure 4:
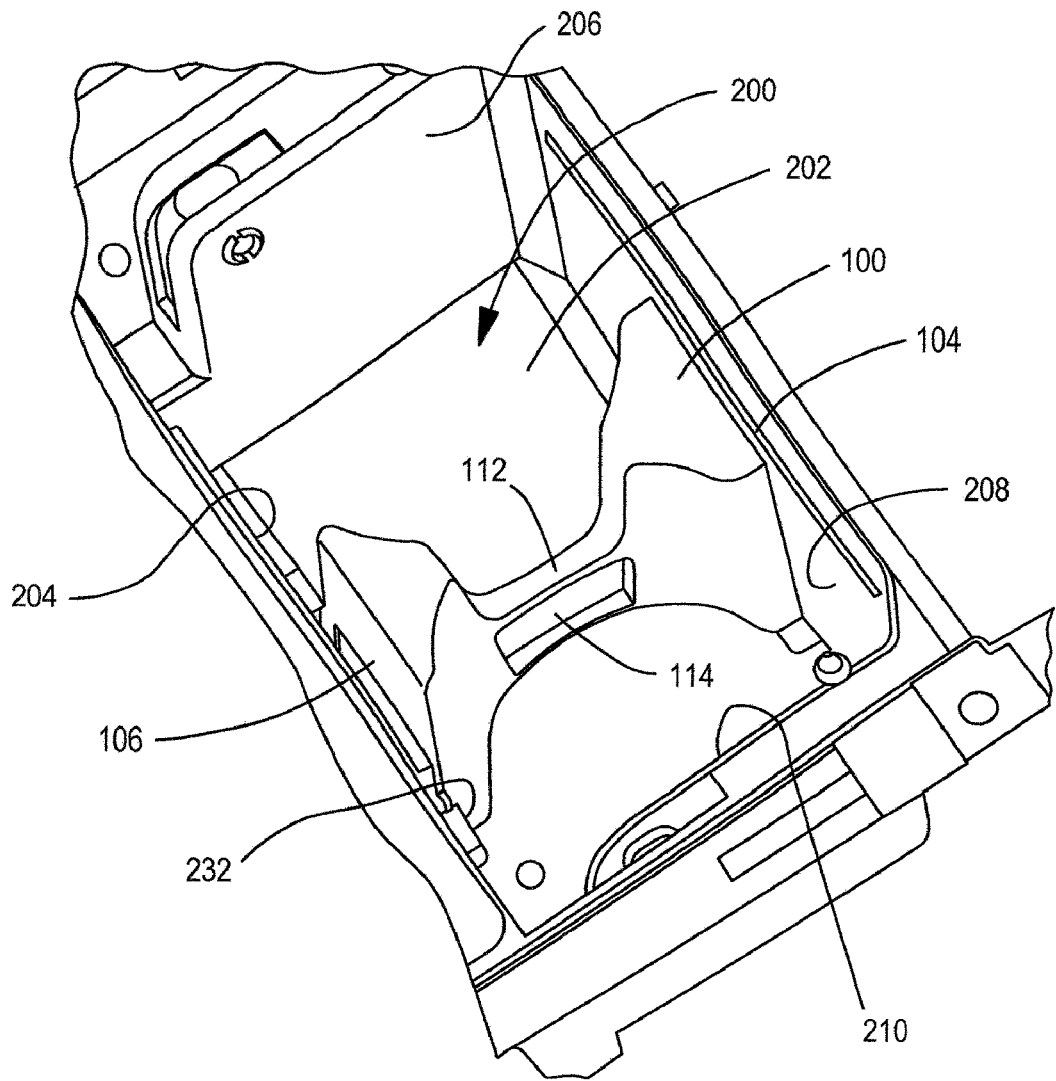
FIG. 4 is a perspective view of the open top of a beverage container containing the adjustable partition element embodiment shown in FIGS. 1-3.

The embodiment of the adjustable partition element 100 is shown in detail with the various views of FIGS. 1-3. The plan and perspective views of FIGS. 1 and 2, illustrate the one piece unitary molded element 100 with opposite ends 104 and 106 and that are joined to a saddle 112 by curved walls 108 and 109 from end 104 and curved walls 110 and 111 from end 106. Saddle 112 is low cut to define a "mug relief" through which coffee mug handles can extend when inserted into the cup holder. In cross-section, saddle 112 has a "T" shape that provides added strength to the partition structure. Below, saddle 112 is a support web 114 that functions to provide added strength and, along with the "T" shape cross-section of saddle 112 provides a finger hold when the element 100 is lifted to be removed or lowered to be inserted into cup holder bin 200. A curved base 102 extends from lower contact points 105 and 107 on one side and 101 and 103 on the other side and provides an arcuate clearance below the saddle 112 and above the floor 202 of the cup holder bin 200 to minimize the footprint contact of partition element 110 with a rubberized mat that is commonly placed on the floor of cup holder bins. Minimizing contact with a rubberized bin floor mat, eliminates unwanted upward pressure that may otherwise work against the friction retention of adjustable partition element 100 in each of its set locations within cup holder bin 200.

FIGS. 2 and 2A illustrate the alignment channel 126 in end wall 104 of adjustable partition element 100 that is configured to mate with any of a plurality of elongated ribs inside cup holder bin 200. Alignment channel 126 contains a lower set of friction tabs 130 and a higher set of friction tabs 132. Each set of tabs 130 and 132 extend into the channel 126 to provide an interference grip with an elongated rib inside cup holder bin 200 when adjustable partition element 100 is inserted into cup holder bin 200. A pair of "V" shaped leading ramp surfaces 128 provide a guiding function to assist one in properly locating the alignment channel 126 of the adjustable element 100 onto an elongated rib inside cup holder bin 200 when adjustable partition element 100 is inserted into cup holder bin 200.

FIG. 3 illustrates the locating tabs 116, 188, 120 and 122 extending from side wall 106 of adjustable partition element 100. The spacing of the locating tabs across the side wall 106 is such that the tabs will interfere with and be held in place by friction against a pair of stops located at predetermined positions within cup holder bin 200.

This embodiment of the adjustable partition element 100 was formed as a unitary structure without any additional moving parts or components. Such a unitary structure is ideal for rapid injection molding techniques from currently available plastic materials. Its rigidity and longevity over several years of frequent use over a wide range of temperatures will dictate the material selected for its manufacture.

The cup holder bin 200 shown in FIG. 4 is a perspective view with the adjustable partition element 100 located in one of a plurality of predetermined locations. In the illustrated position, adjustable partition element 100, along with vertical bin walls 204, 206, 208 and 210 as well as floor 202 define separate areas A and B for receiving and retaining beverage containers. In this embodiment, two beverage containers of can be accommodated in the same cup holder bin 200.

Figures 5, 6, 7:
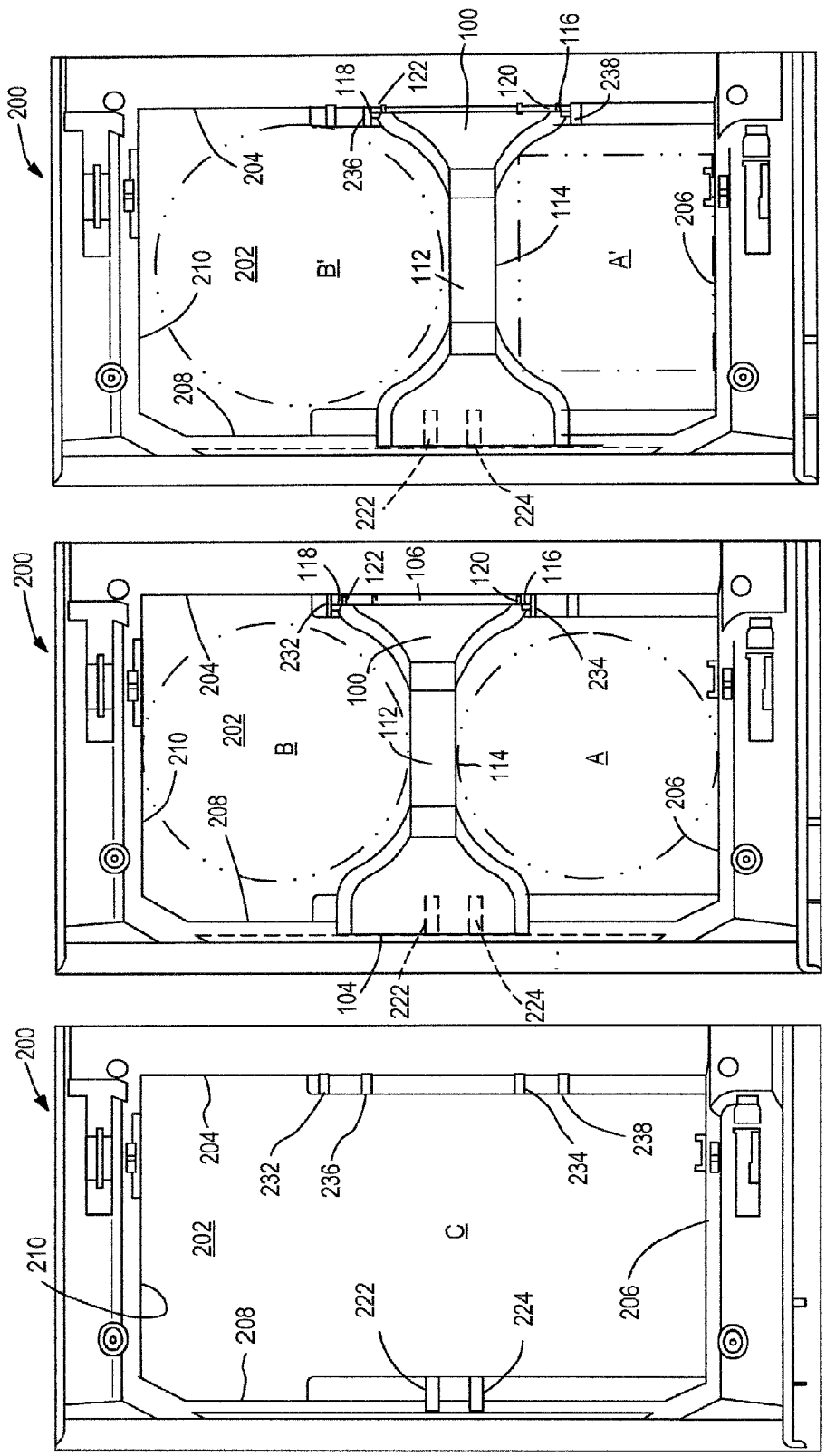
FIG. 5 is a top plan view of the open top of a beverage container in which the adjustable partition element has been removed.
FIG. 6 is a top plan view of the open top of a beverage container in which the adjustable partition element is located in a first position.
FIG. 7 is a top plan view of the open top of a beverage container in which the adjustable partition element is located in a second position.
Figure 8:
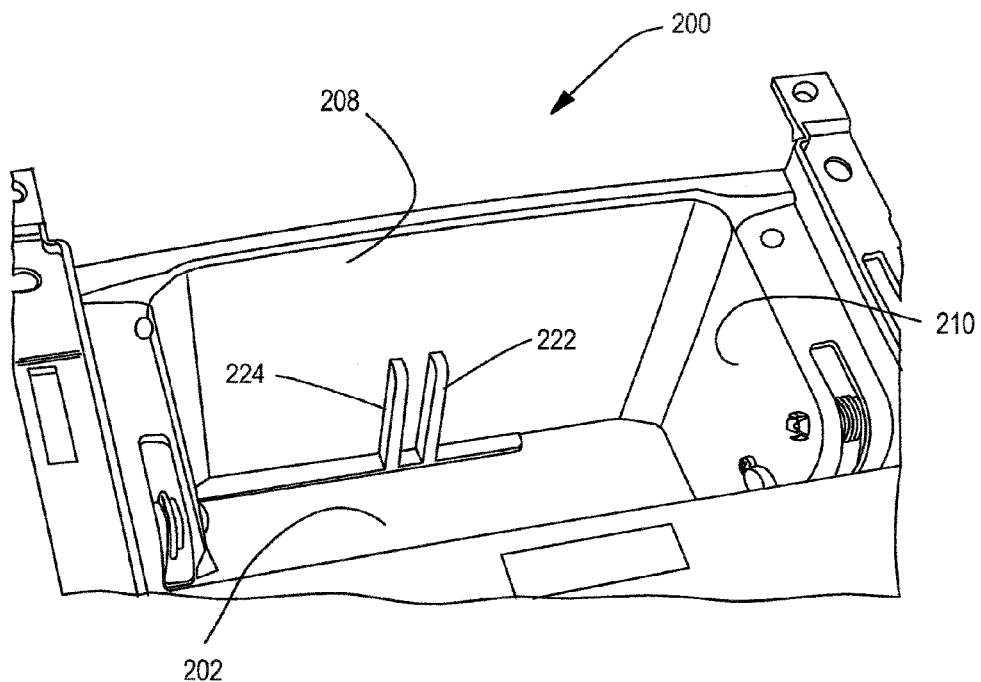
FIG. 8 is a detailed view of a portion of the beverage container showing elongated ribs that engage the locating channel of the adjustable partition element shown in FIGS. 2 and 2A.

In FIGS. 5, 6 and 7, the cup holder bin 200 is shown as a top view, but reversed as compared to FIG. 4. In FIG. 5, the cup holder bin 200 is shown without adjustable partition element 100 installed. Additional detail is provided as compared to FIG. 4 in that elongated ribs 222 and 224 are shown running vertical along side wall 208. Also, stops 232, 234, 236 and 238 are shown located at the junction of bin floor 202 and side wall 204. Elongated ribs 222 and 224 are shown in greater detail in FIG. 8. Stops 232, 234, 236 and 238 are shown in greater detail in FIGS. 9 and 10.

FIG. 6 illustrates the disclosed embodiment of the present invention with adjustable partition element 100 located with its alignment channel 126 positioned on elongated rib 222 and its tabs 116 and 118 respectively abutting stops 232 and 234. This places adjustable partition element 100 in a location that allows two areas A and B to be approximately equal for retaining beverage containers.

FIG. 7 illustrates the disclosed embodiment of the present invention with adjustable partition element 100 located with its alignment channel 126 positioned on elongated rib 224 and its tabs 116 and 118 respectively abutting stops 236 and 238. This places adjustable partition element 100 in a location that allows two areas A' and B' to be differently sized in order to retain beverage containers of different sizes. The dashed lines represent the area for a rectangular container in area A' and a circular container in area B'.

To manually adjust adjustable partition member 100 within cup holder bin 200, one merely grabs member 100 at support web 114 and pulls it upward to release it from its current position. Be moving partition to the next position, a downward force will cause the next elongated rib to be guided into channel 126 by leading ramp surfaces 128 and both sets of friction tabs 130 and 132 provide frictional engagement of the rib and hold partition member 100 in place.

Figure 9:
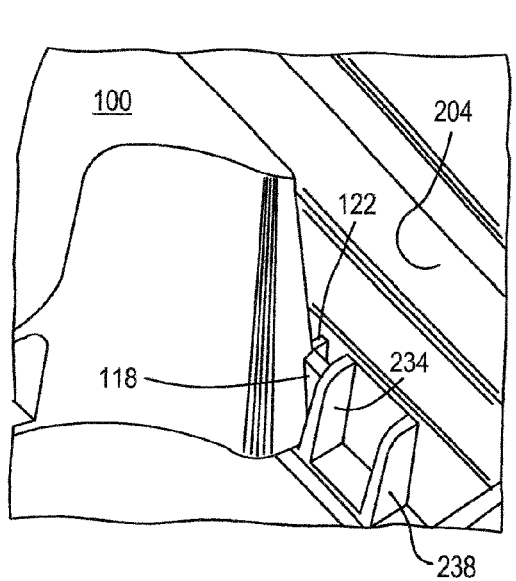
FIG. 9 is a detailed view of another portion of the beverage container showing stops engaging a set of locating tabs on the second side of the adjustable partition element.
Figure 10:
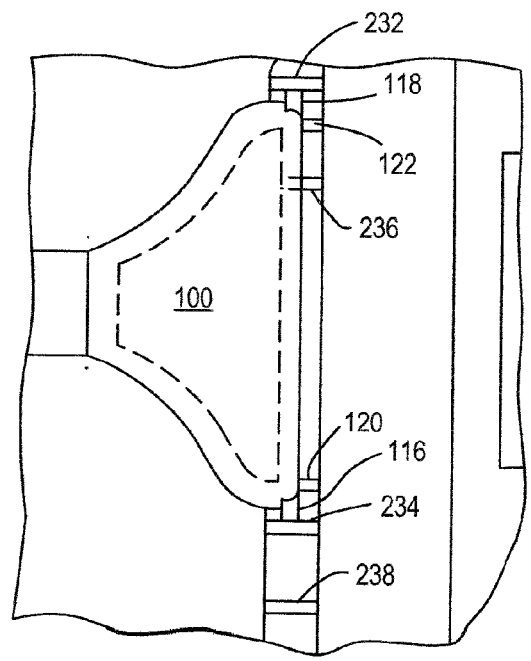
FIG. 10 is a detailed bottom view from that portion of the beverage container shown in FIG. 9 that further shows several sets of stops engaging the locating tabs on the second side of the adjustable partition element.

FIGS. 9 and 10 provide detail of the disclosed embodiment's frictional retention against stops 232 and 234, as depicted in FIG. 6. In those illustrations the locating tabs 116 and 118 extending sideways from partition 100 are frictionally compressed against corresponding stops 232 and 234 extending from bin side wall 204. In addition, locating tabs 118 and 120 extending lengthwise from partition 100 are each frictionally compressed against bin side wall 204. When moved from one position to another, an unused stop such as 236 needs to be accommodated to prevent interference. End 106 contains an opening 113 (FIG. 3) that provides such an accommodation.

It can be seen from the drawings and accompanying explanation, that the present inventive concept is a unique improvement over conventional adjustable cup holders. And while the embodiment described here is a preferred embodiment, it shall not be considered to be a restriction on the scope of the claims set forth below.

I claim:

1. A beverage container holder which can receive and support a plurality of beverage containers, comprising:
    a bin containing a floor, four vertical side walls and an opening through which said beverage containers can be dropped into said bin for retention;
    an adjustable partition member, being a unitary structure, that is manually movable to a plurality of positions within said bin to define separate areas for supporting beverage containers of varying sizes;
    said bin contains a plurality of vertically disposed ribs spaced apart on a first side wall; said ribs each serve to locate said adjustable partition member at a corresponding rib position within said bin and said adjustable partition member having a first end containing a vertical channel for engaging one of said ribs at a corresponding rib position within said bin;
    said bin contains stop elements disposed on a second side wall of said bin opposing said first side wall, wherein said stop elements are disposed in pairs that correspond to each position of said adjustable partition member, and said adjustable partition member contains a set of tabs extending from the lower portion of a second end opposite said first end for abutting a pair of said stop elements at each position within said bin;
    said adjustable partition member is manually adjustable from one location corresponding to the location of a first rib to a different location within said bin by vertically lifting said member and relocating said vertical channel to align with a second rib and lowering said member to the location corresponding to the location of said second rib;
    said partition member is held in place within said bin by friction engagements between said channel to a rib and said tabs to an abutting pair of stop elements;
    said two ends of said partition member are formed to be approximately equal to the depth of said bin member and said ends are joined together by a web portion that is substantially shorter than the depth of said bin member to accommodate cup handles of said beverage containers; and
    said web portion contains protuberances that function as a gripping portion to provide frictional surfaces for allowing said partition to be manually lifted from said bin.

* * * * *